United States Patent [19] [11] 4,189,822
Perline et al. [45] Feb. 26, 1980

[54] METHOD OF FASTENING AND UNFASTENING SNAP FASTENERS

[75] Inventors: Irving W. Perline; Leonard Trapido, both of Kew Gardens; John J. Rottenkolber, Bronx; Michael L. Rottenkolber, Mount Vernon, all of N.Y.

[73] Assignee: Andrew Adams Developing Corporation, Bronx, N.Y.

[21] Appl. No.: 891,052

[22] Filed: Mar. 28, 1978

Related U.S. Application Data

[62] Division of Ser. No. 748,472, Dec. 8, 1976, Pat. No. 4,096,618.

[51] Int. Cl.² .............................................. B23P 11/02
[52] U.S. Cl. ................................................... 29/453
[58] Field of Search ................. 29/278, 280, 227, 453, 29/450; 81/13, 3 R, 125; 294/1 A, 2; 24/40; 145/46; 227/147

[56] References Cited

U.S. PATENT DOCUMENTS 1,435,885 11/1922 Wisroth .................................. 145/46
1,867,928 7/1932 Smith ...................................... 145/46

*Primary Examiner*—James L. Jones, Jr.
*Attorney, Agent, or Firm*—Pennie & Edmonds

[57] ABSTRACT

A hand tool for fastening and unfastening snap fasteners includes a handle and a tool element fixedly secured thereto at one end thereof. The tool element has laterally spaced, co-planar prong members which are adapted to be disposed about the head of a fastener element for grasping and holding the same during a fastening or unfastening operation, the plane of the prong members being disposed perpendicular to the longitudinal axis of the handle. The pronged element is fabricated of spring steel and is folded substantially in half so as to have a substantially U-shaped configuration in side elevation whereby the pronged members are, in effect, supported in a cantilevered manner with respect to the handle. In addition, the operational axis of the pronged members is aligned with that of the handle so as to be able to receive forces transmitted from the handle during a fastening or unfastening operation.

2 Claims, 4 Drawing Figures

METHOD OF FASTENING AND UNFASTENING SNAP FASTENERS

This is a division of application Ser. No. 748,472, filed Dec. 8, 1976, now U.S. Pat. No. 4,096,618.

BACKGROUND OF THE INVENTION

1. Field of the Invention

The present invention relates generally to hand tools, and more particularly to a hand tool which is specifically intended to facilitate the manipulation of snap fasteners during either a snapping or unsnapping operational mode.

2. Description of the Prior Art

Snap fasteners are locking devices which are intended to be used as a convenient means for securing two elements together or detaching the same in a quick and easy manner. However, due to a multitude of factors, the snap fasteners per se, or alternatively, the elements within which the fasteners are secured or mounted, deteriorate, and consequently, the use of the fasteners is severely curtailed with effects ranging from mere inconvenience to deleterious consequences.

As is well-known, fasteners of the foregoing type are normally composed of two mating members which are separately secured or mounted within elements that are to be fastened or joined together. Such fasteners are conventionally used in various applications upon boats, automobiles, trucks, trailers, or the like, and are often found within covers or tarpaulins utilized in conjunction therewith. In performing the fastening operation, the male stud member is snapped into the female socket member thereby forming the fastener assembly, and since the effectiveness of the locked assembly depends upon the friction-fitting of the two members, the dimensions of such members are substantially equal to each other, that is, the outer dimensions of the male stud member and the inner dimensions of the female socket member.

More particularly, it is also well-known that the female member of the fastener assembly contains an encapsulated spring or locking ring which is designed to expand and become seated within a recessed portion of the male member whereby the female and male members are securely locked together. As noted hereinabove, however, because of a multitude of factors, this mating and releasing operation of the fastener members often becomes very difficult. Such factors may be, for example, corrosion, rust, pitting, or mechanical abuse of the fastener members, which will adversely affect the mating of the fastener halves. Rusting or pitting of the snap members, such as, for example, as a result of the elements of the sea and air within marine environments, render the use of such fasteners, over an extended period of time, virtually impossible.

In addition, when such snap fasteners are mounted within the elements that are to be fastened or joined together, the female socket portion of the fastener is usually located at the edge of the element or material within which the same is mounted, and consequently, the material is difficult to grasp so as to maneuver the female snap portion into position with respect to the male portion. Still further, if the material, such as, for example, a boat cover, has been subjected to the elements, often the same shrinks somewhat or the pliability has been altered such that the same again does not readily permit the manipulation thereof in order to accomplish the fastening operation. Correspondingly, if, for example, the material within which the fasteners have been mounted has shrunk, and the fasteners are in their mated condition, unsnapping of the same is rendered quite difficult to accomplish.

Still yet further, the male fastening member may be located in an area which has poor accessibility, particularly by means of a human hand, or one or both of the fastening members may be poorly or loosely secured or mounted within one or both of the elements to be fastened or joined together, such also adversely affecting the mating of the fastening members. As a result of any of the foregoing conditions or effects, it is frequently difficult to snap or unsnap the fastening members, and often, when the fastening members are secured within fabric or other similar material elements, continued attempts at snapping or unsnapping of the fastening members often result in the ripping of the material or the dislodging of the fastening members from the material or other structure. In marine applications, such results are often quite devastating, for if snap-fastened protective tarpaulins are not in fact completely secured, sea winds can gain access to the portion of the craft normally protected by the tarpaulin, dislodge previously secured or snapped portions thereof, and thereby expose the previously protected portions of the craft to the marine elements.

SUMMARY OF THE INVENTION

Accordingly, it is an object of the present invention to provide a hand tool which will facilitate the manipulation of snap fasteners during either a snapping or unsnapping operational mode.

Another object of the present invention is to provide a hand tool which will, in effect, preserve the operational integrity of snap fasteners and therefore lengthen their operative service life.

Still another object of the present invention is to provide a hand tool which will permit the user thereof to overcome the conventional problems normally encountered during a snapping or unsnapping operation of such snap fasteners.

Yet another object of the present invention is to provide a hand tool which will permit the user thereof to securely fasten, or unfasten, snap fasteners regardless of their condition or location.

Yet still another object of the present invention is to provide a hand tool which, as a result of the readily simplified manipulation of snap fasteners, also serves to preserve the operational integrity of the elements or members within which the fasteners are secured and which elements or members are being utilized, for example, as protective devices for variable merchandise.

The foregoing and other objects are achieved in accordance with the present invention through the provision of a hand tool which includes a handle and a tool element fixedly secured thereto at one end thereof. The tool element has laterally spaced, co-planar prong members which are adapted to be disposed about the head of a fastener element for grasping and holding the same during a fastening or unfastening operation, the plane of the prong members being disposed perpendicularly with respect to the longitudinal axis of the handle. The pronged element may be fabricated of spring steel and is folded substantially in half so as to have a substantially U-shaped configuration as viewed in side elevation whereby the pronged members are, in effect, supported in a cantilevered manner with respect to the handle. In addition, the operational axis of the pronged members is aligned with that of the handle so as to be able to receive forces transmitted from the handle during a fastening or unfastening operation.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF A PREFERRED EMBODIMENT

Figure 2:
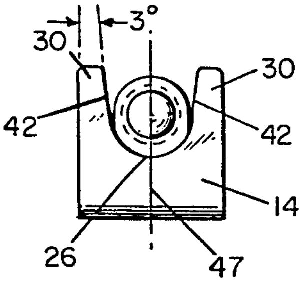
FIG. 2 is an end elevational view of the tool of FIG. 1.
Figure 1:
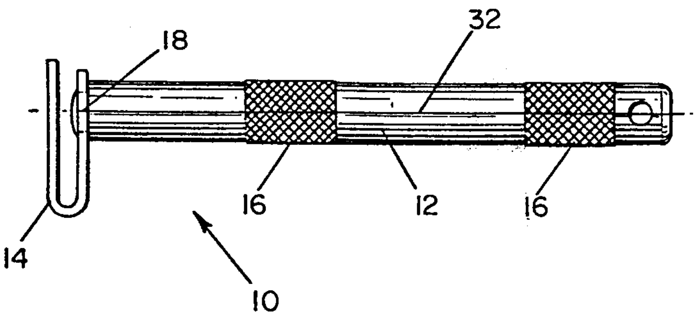
FIG. 1 is a side elevational view of a hand tool constructed in accordance with the present invention and showing its cooperative parts.
Figure 3:
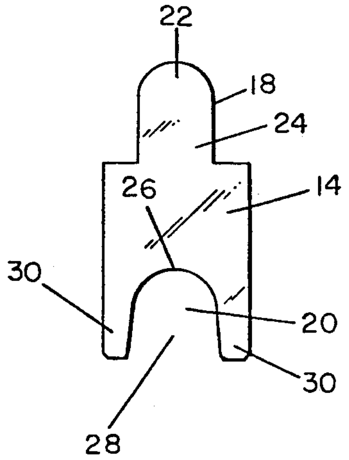
FIG. 3 is a plan view of the fastener-engaging forked portions of the tool as FIG. 1 prior to the bending of the same into its operative mode and the securement of the same to the handle of the tool.

Referring now to the drawings, and more particularly to FIGS. 1-3 thereof, the tool of the present invention is generally indicated by the reference character 10 and is seen to comprise an elongated, cylindrical handle 12 which may, for example, be fabricated of rod-type stock, and a fastener-engaging tool element 14 which is fabricated from sheet-metal stock approximately 0.050 inches thick, such as, for example spring steel. The rod stock from which handle 12 is fabricated may conveniently be approximately 7/16 inches in diameter and a length of approximately four inches, such dimensions rendering the same easy to grasp and retain while the user performs the fastening or unfastening operation, and it will be additionally noted that handle 12 may also be provided with axially spaced knurled portions 16 disposed about the external periphery thereof so as to further facilitate the grasping and manipulation of the tool.

As more particularly seen from FIG. 3, the element 14 has a generally elongated or rectangular configuration with a tongue member 18 being integrally provided at one end thereof while the other end of element 14 is provided with a correspondingly configured cut-out portion 20. The width of tongue portion 18 of element 14 is approximately 9/16 inches, and as can best be appreciated from FIGS. 1 and 2, such facilitates the fixed mounting of element 14 upon one end of handle 12 by any suitable means, such as, for example, riveting. It will also be appreciated that prior to such mounting of element 14 upon handle 12, the same is folded substantially in half, as best seen in FIG. 1, such that the same achieves a substantially U-shaped configuration as the same is viewed from the side thereof, pronged portions 30 therefore being axially spaced from tongue 18.

Tongue portion 18 of element 14 includes a semicircular portion 22 and a substantially rectangular portion 24, while cut-out portion 20 similarly includes a semicircular portion 26 and a substantially rectangular portion 28, the latter two portions also serving to define, along with the remainder of element 14, laterally spaced, co-planar forked prongs 30 upon opposite sides of cut-out portion 20. In this manner, it is to be particularly noted that in so forming element 14 so as to have its U-shaped operational configuration, the central axis of semicircular portions 22 and 26 of tongue 18 and cut-out 20 are to be aligned with each other and with the longitudinal axis 32 of handle 12, and the plane of prongs 30 is disposed perpendicular to axis 32. As a result, pushing and pulling forces may be transmitted along such axes during the fastening and unfastening operational modes without distortion of the tool or any portion thereof.

Figure 4:
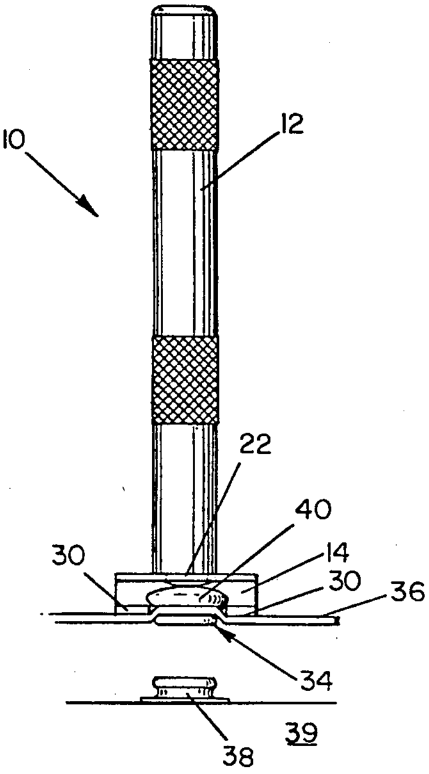
FIG. 4 is a plan view showing the operational mode of the tool of the present invention as the same grasps the head of a female fastener member so as to manipulate the same toward a male fastening member in order to fasten such members together.

In utilizing the device of the present invention for fastening together snap fasteners, such as, for example, a female snap fastener 34 which may be fixedly secured within an element 36, such as, for example, a tarpaulin, and a male snap fastener 38 which may be fixedly secured within another element, such as, for example, a boat deck 39, to which element 6 is adapted to be fastened, as seen in FIG. 4, the forked prongs 30 of tool element 14 are initially disposed about the head 40 such that the head is securely seated within the semicircular portion 26 of cut-out portion 20 and interposed between prongs 30 and tongue 18. In order to facilitate the entry of the fastener head 40 within the cut-out portion 20, the inner walls 42 of element 14 defining cut-out portion 20 and prongs 30 are divergently tapered somewhat, such as, for example, through an angle of 3°, with respect to a vertical plane 44 which includes longitudinal axis 32 and as one proceeds in the direction extending from semicircular portion 26 toward the outermost extents of prongs 30.

Upon the head 40 of fastener 34 being securely fited within semicircular portion 26 of element 14, the material element 36 and fastener 34 may be conveniently manipulated so as to mate fastener 34 with fastener 38.

As the element 14 in its U-shaped configuration is fabricated from the folded sheet stock, the pronged portion 30 thereof is, in effect, cantilevered from the tool assembly defined by handle 12 and tongue portion 18, and consequently, such portion 30 is somewhat resilient and flexible with respect to the remaining portion of element 14 fixedly secured to handle 12. As a result, after the prongs 30 have engaged the head 40 of fastener 34 and it is desired to mate the same with fastener part 38, the resiliency of the pronged portion permits the handle 12 and tongue portion 18 of element 14 to flex somewhat toward the rear of head 40 of fastener 34 and to in fact contact the same whereby an insertion force may be directly transmitted from handle 12 to head 40 of fastener 34 so as to forcedly press the same into engagement with fastener portion 38.

In this manner, a great deal of force, as developed by the user's arm and hand, can be applied to the fastener assembly, such force being substantially greater than that which could possibly be developed solely by means of, for example, the user's thumb if the fasteners were attempted to be mated without using the tool of the present invention. Thumb or hand pressure per se is rarely capable of, for example, developing pressure values beyond 20 psi, however, with the tool of the present invention, pressures greater than 50 psi can in fact be developed. It is also to be understood that while a snap fastening operation has been discussed, an unfastening operation can be similarly conducted, and consequently, a discussion of the same will be omitted herefrom.

As a result of the foregoing, frozen or stuck snaps can be readily unfastened or fastened without damage thereto or to the materials with which the fasteners are operatively associated. Still further, by means of the handled tool and the remote location of the tool element 14 from the opposite end of handle 12 normally inaccessible snaps can be reached whereby the same can be fastened or unfastened.

Obviously, many modifications and variations of the present invention are possible in light of the above teachings. It is to be understood therefore that within the scope of the appended claims, the present invention may be practiced otherwise than as specifically described herein.

What is claimed is:

1. The method for fastening together the mating male and female members of a snap fastener in which each of said members is secured to material which materials are to be joined by the fastener, and in which at least one of said members has a distal portion of greater lateral width than an adjacent portion thereof and which distal portion is spaced from the material to which said one member is secured by said adjacent portion comprising engaging the exterior of said one member with said adjacent portion between the diverging prongs of a fork-type pronged element secured to one end of a handle, said engaging being effected with the prongs of said pronged element positioned between said distal portion and the material to which said one member is secured, manipulating the handle to align said engaged member with the other member of said fastener, and applying pressure to said engaged member through said handle to snap said engaged member into fastened relationship with the other member of the fastener.

2. The method of unsnapping a snap fastener comprising mating male and female members in which each of said members is secured to material which materials are to be joined by the fastener, and in which at least one of said members has a distal portion of greater lateral width than an adjacent portion thereof and which distal portion is spaced from the material to which said one member is secured by said adjacent portion comprising engaging the exterior of said one member with said adjacent portion between the diverging prongs of a fork-type pronged element secured to one end of a handle, said engaging being effected with the prongs of said pronged element positioned between said distal portion and the material to which said one member is secured, manipulating said handle and applying pressure therethrough to said engaged member to unsnap said engaged member from its fastened relationship with the other member of said fastener, and further manipulation the handle to remove said engaged member from its former alignment with the other member of the fastener.

* * * * *